United States Patent
Yun et al.

(10) Patent No.: US 8,798,985 B2
(45) Date of Patent: Aug. 5, 2014

(54) INTERPRETATION TERMINALS AND METHOD FOR INTERPRETATION THROUGH COMMUNICATION BETWEEN INTERPRETATION TERMINALS

(75) Inventors: Seung Yun, Daejeon (KR); Sanghun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 376 days.

(21) Appl. No.: 13/151,648

(22) Filed: Jun. 2, 2011

(65) Prior Publication Data

US 2011/0301936 A1    Dec. 8, 2011

(30) Foreign Application Priority Data

Jun. 3, 2010 (KR) .......... 10-2010-0052550
Nov. 29, 2010 (KR) .......... 10-2010-0119654

(51) Int. Cl.
*G06F 17/28* (2006.01)
(52) U.S. Cl.
USPC ............ 704/2; 704/8; 704/226; 704/234; 704/233
(58) Field of Classification Search
USPC .................. 704/3, 226, 277, 233
See application file for complete search history.

(56) References Cited

U.S. PATENT DOCUMENTS

| | | | |
|---|---|---|---|
| 5,937,379 A | 8/1999 | Tagagi | |
| 6,898,566 B1* | 5/2005 | Benyassine et al. | 704/226 |
| 7,130,801 B2 | 10/2006 | Kitahara et al. | |
| 2002/0022498 A1 | 2/2002 | Hokao | |
| 2002/0046035 A1* | 4/2002 | Kitahara et al. | 704/277 |
| 2002/0059068 A1* | 5/2002 | Rose et al. | 704/246 |
| 2004/0111272 A1* | 6/2004 | Gao et al. | 704/277 |
| 2007/0033020 A1* | 2/2007 | (Kelleher) Francois et al. | 704/226 |
| 2007/0043567 A1* | 2/2007 | Gao et al. | 704/257 |
| 2007/0225967 A1* | 9/2007 | Childress et al. | 704/9 |
| 2008/0269926 A1* | 10/2008 | Xiang et al. | 700/94 |
| 2008/0280653 A1* | 11/2008 | Ma et al. | 455/569.1 |
| 2009/0177461 A1* | 7/2009 | Ehsani et al. | 704/2 |
| 2010/0036659 A1* | 2/2010 | Haulick et al. | 704/226 |
| 2010/0062713 A1* | 3/2010 | Blamey et al. | 455/41.3 |
| 2010/0174535 A1* | 7/2010 | Vos et al. | 704/207 |
| 2010/0185434 A1* | 7/2010 | Burvall et al. | 704/3 |
| 2010/0235161 A1* | 9/2010 | Kim et al. | 704/3 |
| 2010/0253851 A1* | 10/2010 | Itou et al. | 348/607 |

FOREIGN PATENT DOCUMENTS

| | | |
|---|---|---|
| JP | 6-208388 | 7/1994 |
| JP | 9-252268 | 9/1997 |
| JP | 2001-127846 | 5/2001 |
| JP | 2001-251429 | 9/2001 |

(Continued)

*Primary Examiner* — Douglas Godbold
*Assistant Examiner* — Mark Villena
(74) *Attorney, Agent, or Firm* — Kile Park Reed & Houtteman PLLC

(57) ABSTRACT

A method for interpreting a dialogue between two terminals includes establishing a communication channel between interpretation terminals of two parties in response to an interpretation request; specifying a language of an initiating party and a language of the other party in each of the interpretation terminals of the two parties by exchanging information about the language of the initiating party used in the interpretation terminal of the initiating party and the language of the other party used in the interpretation terminal of the other party via the communication channel; recognizing speech uttered from the interpretation terminal of the initiating party; translating the speech recognized by the interpretation terminal of the initiating party into the language of the other party; and transmitting a sentence translated into the language of the other party to the interpretation terminal of the other party.

15 Claims, 3 Drawing Sheets

(56) References Cited

FOREIGN PATENT DOCUMENTS

| | | |
|---|---|---|
| JP | 2001-306564 | 11/2001 |
| JP | 2003-280696 | 10/2003 |
| JP | 20005-318346 | 11/2005 |
| JP | 2007-207061 | 8/2007 |
| KR | 10-0411439 B1 | 12/2003 |
| KR | 10-2006-0044143 A | 5/2006 |

* cited by examiner

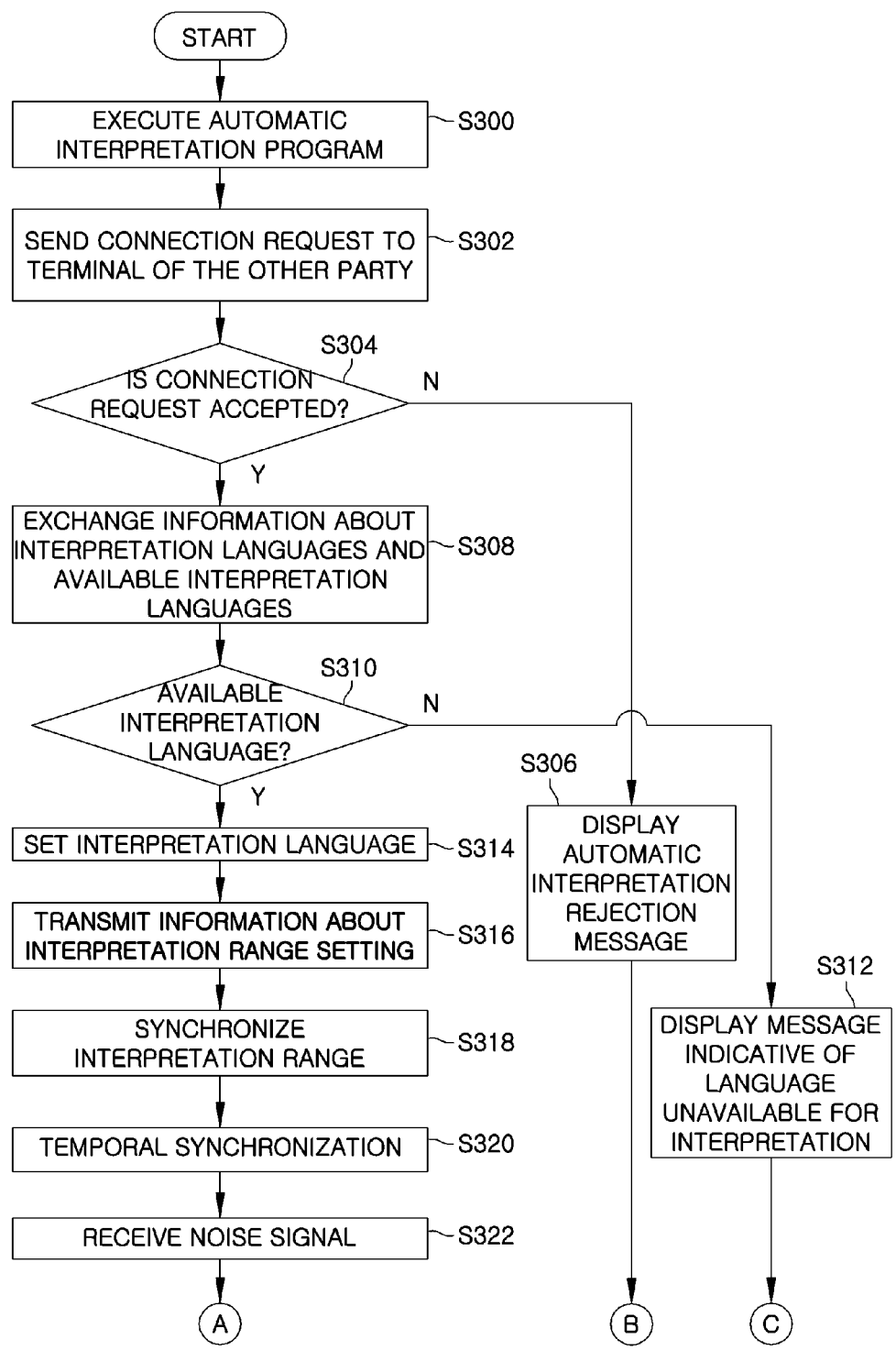

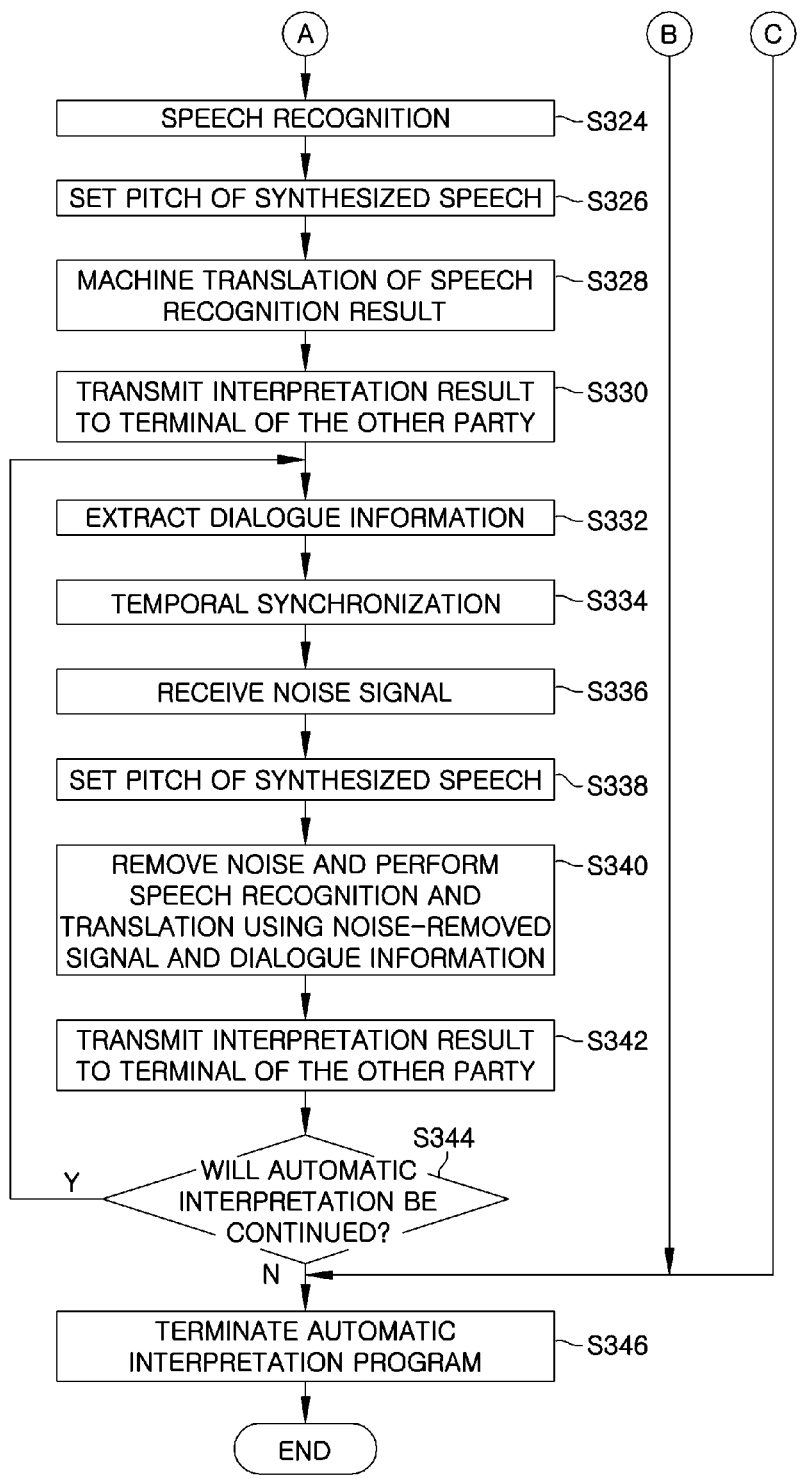

INTERPRETATION TERMINALS AND METHOD FOR INTERPRETATION THROUGH COMMUNICATION BETWEEN INTERPRETATION TERMINALS

FIELD OF THE INVENTION

The present invention relates to an interpretation terminal, and more particularly, to interpretation terminals and a method for interpretation through communication between the interpretation terminals.

BACKGROUND OF THE INVENTION

Conventionally, automatic interpretation has been performed mainly on a server, a workstation, or a PC (Personal Computer). This is because the automatic interpretation technology includes three component technologies: speech recognition, machine translation, and speech synthesis, all of which need a large amount of calculation and a mass storage unit. Nowadays, as the performance of portable devices such as smart phones and personal digital assistants (PDAs) is evolving and the portable devices have large capacity of memory enough to execute automatic interpretation, various attempts to equip a portable device with the automatic interpretation technology are being made. In case a portable device is equipped with an automatic interpreter adopting the automatic interpretation technology, the user can use the automatic interpretation function at any time and any place, whereby user's convenience is considerably enhanced.

However, the automatic interpreter incorporated into a portable device merely transmits an automatic interpretation result through speech synthesis to the other party, but does not exchange any information with a portable device carried by the other party. Thus, a variety of useful information helping to improve the automatic interpretation performance cannot be utilized. For example, if no information is provided about what language the other party uses, the user does not know what target language should be used to execute automatic interpretation.

In addition, depending on the performance of the automatic interpreter, it may be advantageous to specify a place or area of application of interpretation, for example, an interpretation range, such as restaurants, shopping, medical, transportation, etc., in advance and execute interpretation within a limited range, rather than interpreting for all areas. However, if such information is not consistent between the user of the automatic interpreter and the other party, the other party has to modify its information, one by one, to be suited to the user's information.

Automatic interpretation is an interaction between people, and therefore, if the interaction is understood through a process of understanding speech language in the course of automatic interpretation and information associated with this interaction is provided, this will be of much help in speech recognition and translation. For example, if the user asks the name of the other party, it is expected that the other party will say his or her name in the next speech. Therefore, by giving a weight value to information corresponding to the name, and looking up a lexicon of personal names separately, the next speech recognition can be efficiently implemented as compared to not doing such processing. Also, in a translation process, information such as name serves as auxiliary information which can be used for transliteration or to efficiently resolve ambiguity. However, such information cannot be used in the conventional technology because there is no exchange of the related information.

In addition, the conventional speech recognition technology is highly susceptible to noise. Thus, when noise is introduced together with a speech signal, speech recognition performance is significantly deteriorated. For example, in case of automatic interpretation in a portable device, it is to be expected that an automatic interpreter will be used in places exposed to various noise sources, such as subway stations, shopping centers, crowded restaurants, etc. This will inevitably lead to speech recognition performance degradation due to noise, which is difficult to be resolved in the conventional technology.

Moreover, the pitch of synthesized speech may need to be adjusted differently depending on whether it is quiet or noisy. With the conventional technology, however, the user cannot handle such situations without manual manipulation.

SUMMARY OF THE INVENTION

In view of the above, the present invention provides an interpretation terminals and a method for interpretation through communication between the interpretation terminals, which improve automatic interpretation performance by exchanging information that can be used for automatic interpretation through communication between two or more portable automatic interpretation terminals.

In accordance with a first aspect of the present invention, there is provided an interpretation terminal comprising:

a network interface for communicating with an interpretation terminal of the other party;

a speech recognizer for recognizing uttered speech from an initiating party;

a translation module for translating the speech recognized by the speech recognizer into a designated language; and a controller for specifying an interpretation language through the network interface and providing a sentence translated by the translation module to the interpretation terminal of the other party.

Preferably, the network interface performs communication with the interpretation terminal of the other party via a wireless local area network (WLAN) or via a mobile communication network.

Preferably, the WLAN includes wireless-fidelity (Wi-Fi).

Preferably, upon request for interpretation of a conversation with the other party, the network interface establishes a communication channel with the interpretation terminal of the other party to exchange information required for the establishment with the interpretation terminal of the other party.

Preferably, the controller unifies an interpretation range between the two parties by communicating with the interpretation terminal of the other party through the network interface.

Preferably, the information about the interpretation range defines a place and situation where the interpretation is performed.

Preferably, the speech recognizer detects noise from a speech signal of the initiating party, and performs speech recognition on the speech signal from which the noise is removed.

Preferably, the speech signal mixed with noise from the initiating party is compared with a noise signal transmitted from the interpretation terminal of the other party to detect a matching portion between the speech signal and the noise signal as noise.

Preferably, the interpretation terminal further comprising:

a speech synthesizer for synthesizing the sentence translated by the translation module and outputting the sentence as voice.

Preferably, the pitch of the synthesized speech output by the speech synthesizer is set to be proportional to signal-to-noise ratio (SNR) between the noise signal previously transmitted from the interpretation terminal of the other party and the speech signal of the initiating party.

Preferably, the speech recognizer employs a dialog model to analysis the translated sentence, predict a next dialogue to be uttered based on the analysis result, and utilize the predicted dialog information in the recognition of speech to be uttered next.

In accordance with a second aspect of the present invention, there is provided a method for interpreting a dialogue between two terminals, the method comprising:

establishing a communication channel between interpretation terminals of two parties in response to an interpretation request;

specifying a language of an initiating party and a language of the other party in each of the interpretation terminals of the two parties by exchanging information about the language of the initiating party used in the interpretation terminal of the initiating party and the language of the other party used in the interpretation terminal of the other party via the communication channel;

recognizing speech uttered from the interpretation terminal of the initiating party;

translating the speech recognized by the interpretation terminal of the initiating party into the language of the other party; and transmitting a sentence translated into the language of the other party to the interpretation terminal of the other party.

Preferably, the communication channel is established through a wireless local area network (WLAN), a mobile communication network, or via near field communications (NFC).

Preferably, the WLAN includes wireless-fidelity (Wi-Fi).

Preferably, said recognizing speech uttered from the interpretation terminal of the initiating party includes:

performing synchronization between the interpretation terminals of the two parties;

detecting noise from a speech signal of the initiating party; and performing speech recognition on the speech signal from which noise is removed.

Preferably, said detecting noise from the speech signal of the initiating party includes:

comparing the speech signal mixed with noise from the initiating party with a noise signal transmitted from the interpretation terminal of the other party; and detecting a matching portion between the speech signal and the noise signal as noise.

Preferably, the method further includes performing speech synthesis on the translated sentence to output the sentence as voice.

Preferably, the method further includes unifying information defining an interpretation range between the two parties by communicating with the interpretation terminal of the other party.

Preferably, the information about the interpretation range defines a place and situation where the interpretation is performed.

BRIEF DESCRIPTION OF THE DRAWINGS

The above and other objects and features of the present invention will become apparent from the following description of embodiments, given in conjunction with the accompanying drawings, in which:

FIGS. 3A and 3B illustrate a flowchart for explaining a process of interpretation through communication between interpretation terminals in accordance with an embodiment of the present invention.

DETAILED DESCRIPTION OF THE EMBODIMENTS

Hereinafter, the operating principle of the present invention will be described in detail with reference to the accompanying drawings. In the following description, well-known functions or constitutions will not be described in detail if they would obscure the invention in unnecessary detail. Further, the terminologies to be described below are defined in consideration of functions in the present invention and may vary depending on a user's or operator's intention or practice. Therefore, the definitions should be understood based on all the contents of the specification.

Figure 1:
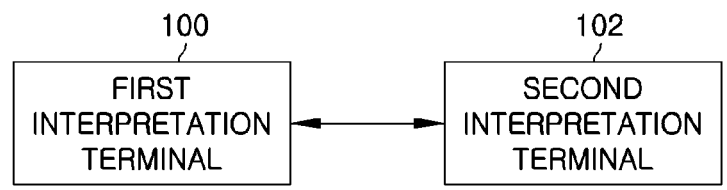
FIG. 1 illustrates a diagram of at least two interpretation terminals for performing interpretation of a dialogue between two parties in accordance with an embodiment of the present invention.

FIG. 1 illustrates a diagram of at least two interpretation terminals for performing interpretation of a dialogue between two parties in accordance with an embodiment of the present invention. A first interpretation terminal 100 and a second interpretation terminal 102, as a whole, have the same configuration, and are used to perform interpretation of a dialogue between parties using different languages. The first and second interpretation terminals 100 and 102 may be dedicated automatic interpretation terminals, or smart phones capable of executing automatic interpretation programs, or personal information terminals such as personal digital assistants (PDAs), or mobile terminals, such as mobile internet devices (MIDs), net-books, and notebooks, capable of executing automatic interpretation programs. These terminals should be easy to carry around and equipped with a device capable of communicating with a terminal on the other side.

In the following, for convenience of explanation, the first interpretation terminal 100 will be called an interpretation terminal of an initiating party, and the second interpretation terminal 102 will be called an interpretation terminal of the other party.

When an interpretation is performed between the interpretation terminal 100 of the initiating party and the interpretation terminal 102 of the other party, the interpretation terminal 100 of the initiating party and the interpretation terminal 102 of the other party specify languages to be interpreted by communicating with each other. For example, assuming that the parties involved are a Korean and an American, respectively, from the standpoint of the initiating party, the interpretation terminal 100 of the initiating party specifies an interpretation language as English to interpret Korean to English, whereas the interpretation terminal 102 of the other party specifies an interpretation language as Korean to interpret English to Korean. Likewise, from the standpoint of the other party, the interpretation terminal 100 of the other party specifies an interpretation language as Korean to interpret English to Korean, whereas the interpretation terminal 102 of the initiating party specifies an interpretation language as English to interpret Korean to English. In the embodiment of the present invention, a dialogue between the two parties is to be interpreted and therefore, both the interpretation terminals 100 and 102 of the two parties are configured to interpret both English and Korean.

The interpretation terminals 100 and 102 recognize dialogue speech utterances of the two parties, and translate the recognized dialogue speech utterances into the specified translation languages and provide translation results to the interpretation terminals 100 and 102 of the two parties.

Figure 2:
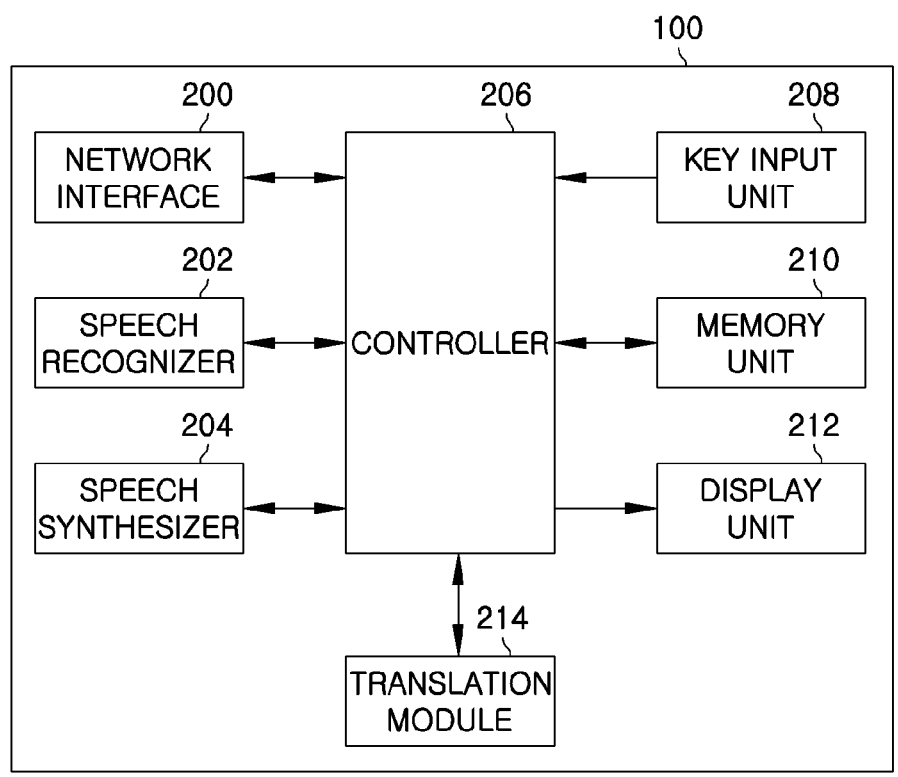
FIG. 2 depicts a detailed block diagram of any one of the interpretation terminals shown in FIG. 1.

FIG. 2 depicts a block diagram of any one, e.g., the interpretation terminal 100, of the interpretation terminals shown in FIG. 1. A network interface 200 performs communication with the interpretation terminal 102 of the other party who wants interpretation via a wireless local area network (WLAN) such as wireless-fidelity (Wi-Fi), via a mobile communication network such as CDMA, or via near field communications (NFC) such as Bluetooth.

A speech recognizer 202 recognizes a dialogue speech utterance of the initiating party as an interpretation target. The dialogue speech as the interpretation target may be mixed with noise. Thus, the speech recognizer 202 compares the dialogue speech, as the interpretation target, mixed with noise from the interpretation terminal 100 with a noise signal transmitted from the interpretation terminal 102 of the other party, and detects a matching portion between the speech signal mixed with noise that needs to be interpreted and the noise signal as noise. The detected noise is removed from the speech mixed with noise that is to be interpreted, and only the speech signal from which noise has been removed is used in speech recognition. This contributes to improving the quality of interpretation.

A translation module 214 performs machine translation of recognized speech provided from the speech recognizer 202 into a designated language to interpret a conversation with the other party, and generates a translation result as a text sentence. The translation result is transmitted to the interpretation terminal 102 of the other party.

A speech synthesizer 204 speech-synthesizes and outputs the text of a translated sentence transmitted from the interpretation terminal of the other party by using a text-to-speech (TTS) technology widely known in the art. In addition, the speech synthesizer 204 may speech-synthesize and output a result of a translation performed by the interpretation terminal 100. Here, the magnitude of a speech synthesis signal output from the speech synthesizer 204 is determined based on the intensity of a surrounding noise signal provided from the speech recognizer 202.

A key input unit 208 is provided with plural numeric keys used in the interpretation terminal 100, and generates corresponding key data and outputs it to a controller 206 when the initiating party presses a predetermined key.

A display unit 212 displays various information generated from the interpretation terminal 100 under the control of the controller 206, and receives and displays key data generated from the key input unit 208 and various information signals of the controller 206.

The controller 206 controls the overall operations of the interpretation terminal 100 depending on various operation programs stored in a memory unit 210. The aforementioned operation programs generally refer to software pre-programmed during production to connect the display unit 212 and the key input unit 208, manage the input/output of data, or operate an embedded application of the interpretation terminal 100, as well as a basic operating system and an automatic interpretation program which are required for the operation of the interpretation terminal 100.

Additionally, when performing interpretation, the controller 206 controls such that interpretation is performed between the two parties using different languages by specifying an interpretation language and a range of interpretation targets through communication with the interpretation terminal of the other party over the network interface 200, recognizing speech input from the initiating party and translating the speech into the specified translation language, and then speech-synthesizing to output it.

FIGS. 3A and 3B illustrate a flowchart for explaining a method for automatic interpretation through communication between two or more portable automatic interpretation terminals in accordance with the present invention. Hereinafter, the method of this embodiment will be described in detail with reference to FIGS. 1 and 2.

First, when the initiating party requires automatic interpretation of a conversation with the other party, an automatic interpretation programs equipped in the interpretation terminal 100 of the initiating party who wants automatic interpretation and the interpretation terminal 102 of the other party are executed in step S300. Upon executing the automatic interpretation programs, the interpretation terminal 100 of the initiating party and the interpretation terminal 102 of the other party attempt to open a communication channel between them. For communication, a connection request is sent to the other party via NFC such as Bluetooth, via Wi-Fi or via a wireless communication network in step S302.

Next, in step S304, if the other party accepts the connection request, a communication channel is established between the interpretation terminal 100 of the initiating party and the interpretation terminal 102 of the other party. In some cases wherein the other party has made an environmental setting in which the other party always accepts a communication connection, a communication channel may be established automatically without acceptance.

However, in step S304, if the other party rejects the connection request, the method proceeds to step S306 to display a message indicating that the other party has rejected automatic interpretation on the interpretation terminal 100 of the initiating party. After that, the communication connection is released and the automatic interpretation program is terminated in step S346.

Meanwhile, once a communication channel is established between the interpretation terminals 100 and 102 of the two parties, in step S308, the interpretation terminals 100 and 102 of the two parties first exchange information about the languages of the two parties to be used for interpretation and available languages into which the languages of the two parties can be interpreted.

Subsequently, the interpretation terminals 100 and 102 of the two parties check whether the language of the other party is an available interpretation language in step S310. If the language of the other party is not available for automatic interpretation, the method proceeds to step S312 in which the interpretation terminal 100 of the initiating party transmits a message indicating that the language of the other party is unavailable for automatic interpretation to the interpretation terminal 102 of the other party. And then, the communication is released and the automatic interpretation program is terminated in step S346.

However, as a result of determination of step s310, if the languages of the two parties can be interpreted by the interpretation program, the method proceeds to step S314 to specify an interpretation language in each of the interpretation terminals 100 and 102 of the two parties.

Thereafter, to specify a place or area of application of interpretation, for example, an interpretation range, such as restaurants, shopping, medical, transportation, etc., the interpretation terminal 100 of the initiating party transmits information about the interpretation range to the interpretation terminal 102 of the other party in step S316 to automatically synchronize it with the interpretation range of the interpretation terminal 102 of the other party in step S318.

Next, the interpretation terminal 100 of the initiating party starts interpretation of a speech utterance from the initiating party by a speech recognizer. At this point, information indicative of the start of interpretation is transmitted to the interpretation terminal 102 of the other party, and temporal synchronization for interpretation is established between the interpretation terminal 100 of the initiating party and the interpretation terminal 102 of the other party in step S320. After synchronization between the two parties, the interpretation terminal 100 of the initiating party receives a surrounding noise signal input from the interpretation terminal 102 of the other party in step S322. Then, the interpretation terminal 100 of the initiating party 100 compares a speech signal mixed with noise with the surrounding noise signal transmitted from the interpretation terminal 102 of the other party during a speech recognition process, recognizes a matching portion between the two signals as noise, separates the speech signal, from which the noise signal is removed, from the speech signal mixed with noise, and carries out speech recognition on the separated speech signal in step S324.

The above-described noise removal method may employ noise removal techniques using two-channel signal processing well known in the art. When the speech recognition of the separated speech signal is completed, the speech signal is passed to the translation module 214 to translate the speech on which the speech recognition is performed in step S328. Subsequently, a translation result is transmitted to the interpretation terminal 102 of the other party. As the translation result on the interpretation terminal 102 of the other party, a translated sentence is displayed on the display unit 212, and at the same time output as speech by speech synthesis in step S330. Before performing step S328, the pitch of the synthesized speech output by the speech synthesizer may be set to an appropriate level by calculating signal-to-noise ratio (SNR) between the noise signal previously transmitted from the interpretation terminal 102 of the other party and the speech signal of the initiating party in step S326. The step of setting the pitch of the synthesized speech may be performed after the aforementioned step S326 or after step S328.

Meanwhile, a response, i.e., a translated sentence, is transmitted to the interpretation terminal 100 of the initiating party from the interpretation terminal 102 of the other party by the aforementioned speech recognition process. Then, the interpretation terminal 100 of the initiating party employs a dialog model for understanding of speech language to analysis the translated sentence, extract the intention of the initiating party, predict the next dialogue to be uttered based on the analysis result, and utilize the predicted utterance information in speech recognition in step S332. The utterance information may be predicted in various ways. For example, assuming that a sentence "Will you give me the name of the person who made reservation?" is transmitted, an analysis of this sentence shows that the speech act is a "request", the object of the request is a "name', and the "name" has a property of a person who made "reservation". Based on these analyses, the next utterance may be expected to be a name through a pre-established dialogue model.

In speech recognition using dialogue information, a search space of a language model is limited to an utterance containing a name, or personal names usually are not listed in their entirety as recognizable words due to a limited size of the lexicon. Despite this, the portion corresponding to the "name" can be found separately in a large-scale lexicon of personal names, thereby improving the speech recognition performance.

Subsequently, the interpretation terminal 102 of the other party performs speech recognition in order to respond to the content of the dialogue delivered from the interpretation terminal 100 of the initiating party in step S334.

When the interpretation terminal 102 of the other party performs speech recognition, as in the temporal synchronization step S320 performed by the interpretation terminal 100 of the initiating party, information of an interpretation attempt is transmitted to the interpretation terminal 100 of the initiating party from the interpretation terminal 102 of the other party, and thus the interpretation terminal 100 of the initiating party and the interpretation terminal 102 of the other party are temporally synchronized with each other and a noise signal is transmitted to the interpretation terminal 100 of the initiating party from the interpretation terminal 102 of the other party in step S336. In a next step S338, the SNR between the noise signal transmitted from the interpretation terminal 102 of the other party and a speech signal of the initiating party is calculated to set the pitch of synthesized speech to be output through the speech synthesizer. As previously stated, the step of setting the pitch of the synthesized speech may be performed after the aforementioned step S336 or after step S340 to be described below.

In a subsequent step S340, the interpretation terminal 100 of the initiating party compares a speech signal mixed with noise with the surrounding noise signal transmitted from the interpretation terminal 102 of the other party during a speech recognition process, recognizes a matching portion between the two signals as noise, separates the speech signal, from which the noise signal is removed, from the speech signal mixed with noise, carries out speech recognition on the separated speech signal, and passes a result of the speech recognition to the translation module 214.

In this process, speech recognition using dialogue information is carried out as described above. The speech recognition using dialogue information may be done in real time simultaneously with noise removal. Alternatively, the speech recognition using dialogue information may be performed on a signal from which noise is removed. And, utterance information may be also transmitted to the translation module to perform translation using dialogue information. For example, if an utterance "My name is Hong Gil-Dong" comes from the terminal 102 of the other party in response to an utterance "Will you give me the name of the person who made reservation?" from the terminal 100 of the initiating party, the corresponding sentence passes through the language understanding module and an analysis of this sentence shows that the speech act is "give-information", the object of giving information is a "name', and the "name" has a property of "Hong Gil-Dong".

As the word "Hong Gil-Dong" is found to be ambiguous based on the analyzed information, the translation module transliterates the word, rather than translating the word using a translation dictionary even if the word is listed in the translation dictionary. The sentence so translated is transmitted to the terminal 102 of the other party and used again in the next speech recognition and translation process in step S342. Also, the translated sentence is displayed on the display unit 212 of the terminal 100 of the initiating party, and also output as voice by the speech synthesizer.

Through this process, speech recognition and translation performance can be improved, and thus automatic interpretation performance can be enhanced. Although the example of speaking in Korean has been described herein, the automatic interpretation performance on utterances spoken in any language can be improved through speech language understanding if a speech language understanding module for that language is embedded.

Subsequently, in step S344, when continuing automatic interpretation of a conversation with the other party, the flow returns to step S332 to repeat the above-described process. Otherwise, when the automatic interpretation is completed in step S344, the flow proceeds to step S346 to issue a command to terminate the automatic interpretation program or release the connection with the other party. Thus, the connection is cut off and the automatic interpretation process is finished.

While the foregoing embodiment has been described with respect to the method and apparatus for improving automatic interpretation performance using communication between two automatic interpretation terminals, the present invention is applicable in the same manner to multiple automatic interpretation terminals in the same space without being limited to two terminals.

In accordance with the present invention, when performing interpretation, the native languages and available interpretation languages of two parties are made to coincide with each other by exchanging information about the native languages and available interpretation languages between them, thereby properly performing automatic interpretation. Moreover, the range of interpretation targets is unified, thus improving interpretation performance.

In addition, speech recognition performance can be improved by effectively extracting only a speech signal using a noise signal of the other party, and convenience can be further increased by automatically adjusting the pitch of synthesized speech using a noise signal depending on the surrounding circumstances. Further, the content of a dialogue predicted by the process of receiving an interpreted sentence and analyzing and understanding it is used in speech recognition and interpretation, thereby improving interpretation performance.

While the invention has been shown and described with respect to the particular embodiments, it will be understood by those skilled in the art that various changes and modification may be made without departing from the scope of the following claims.

What is claimed is:

1. A mobile interpretation terminal of an initiating party, comprising:
 a network interface configured to communicate with a mobile interpretation terminal of an other party;
 a speech recognizer configured to recognize an uttered sentence from a speech signal of the initiating party;
 a translation module configured to translate the sentence recognized by the speech recognizer into an interpretation language; and
 a controller configured to specify the interpretation language and to instruct the network interface to transmit the translated sentence to the interpretation terminal of the other party,
 wherein the speech recognizer is configured to detect noise from the speech signal of the initiating party, and to perform speech recognition on the speech signal from which the noise is removed, and
 wherein the speech recognizer is configured to compare the speech signal mixed with the noise from the initiating party with a noise signal transmitted from the interpretation terminal of the other party to detect a matching portion between the speech signal and the noise signal as the noise.

2. The interpretation terminal of claim 1, wherein the network interface is configured to perform communication with the interpretation terminal of the other party via a wireless local area network (WLAN), via a mobile communication network, or via near field communications (NFC).

3. The interpretation terminal of claim 2, wherein the WLAN comprises wireless-fidelity (Wi-Fi).

4. The interpretation terminal of claim 1, wherein, upon request for interpretation of a conversation with the other party, the network interface is configured to establish a communication channel with the interpretation terminal of the other party to exchange information required for the establishment with the interpretation terminal of the other party.

5. The interpretation terminal of claim 1, wherein the controller is configured to instruct the network interface to transmit unifying information defining an interpretation range between the two parties to the interpretation terminal of the other party.

6. The interpretation terminal of claim 5, wherein the unifying information defines a place and situation where the interpretation is performed.

7. The interpretation terminal of claim 1, further comprising:
 a speech synthesizer configured to synthesize the translated sentence and output the synthesized sentence as voice.

8. The interpretation terminal of claim 7, wherein the pitch of the synthesized sentence output by the speech synthesizer is set to be proportional to a signal-to-noise ratio (SNR) between the noise signal transmitted from the interpretation terminal of the other party and the speech signal of the initiating party.

9. The interpretation terminal of claim 1, wherein the speech recognizer is configured to employ a dialog model to analyze the translated sentence, predict a next dialogue to be uttered based on the analysis result, and utilize the predicted dialog information in the recognition of speech to be uttered next.

10. A method performed by a mobile interpretation terminal of an initiating party for communicating with a mobile interpretation terminal of an other party, the method comprising:
 establishing a communication channel with the interpretation terminal of the other party in response to an interpretation request;
 specifying an interpretation language of the other party by receiving information about the interpretation language from the interpretation terminal of the other party via the communication channel;
 recognizing an uttered sentence from a speech signal of the initiating party;
 translating the sentence recognized by the interpretation terminal of the initiating party into the interpretation language of the other party; and
 transmitting the translated sentence to the interpretation terminal of the other party,
 wherein the recognizing the uttered sentence comprises:
  performing synchronization with the interpretation terminal of the other party;
  detecting noise from the speech signal of the initiating party; and
  performing speech recognition on the speech signal from which the noise is removed, and wherein the detecting the noise from the speech signal of the initiating party comprises:
  comparing the speech signal mixed with the noise from the initiating party with a noise signal transmitted from the interpretation terminal of the other party; and
  detecting a matching portion between the speech signal and the noise signal as the noise.

11. The method of claim 10, wherein the communication channel is established through a wireless local area network (WLAN), a mobile communication network, or via near field communications (NFC).

12. The method of claim 11, wherein the WLAN comprises wireless-fidelity (Wi-Fi).

13. The method of claim 10, further comprising:
  performing speech synthesis on the translated sentence and outputting the synthesized sentence as voice.

14. The method of claim 10, further comprising:
  transmitting unifying information defining an interpretation range between the two parties to the interpretation terminal of the other party.

15. The method of claim 14, wherein the unifying information defines a place and situation where the interpretation is performed.

* * * * *